United States Patent
Muthuvelu

(10) Patent No.: US 10,078,674 B2
(45) Date of Patent: Sep. 18, 2018

(54) INTEGRATED WORKFLOW AND DATABASE TRANSACTIONS

(75) Inventor: Swami Muthuvelu, Bristow, VA (US)

(73) Assignee: MCL Systems Limited, Manassas, VA (US)

( * ) Notice: Subject to any disclaimer, the term of this patent is extended or adjusted under 35 U.S.C. 154(b) by 255 days.

(21) Appl. No.: 13/115,090

(22) Filed: May 24, 2011

(65) Prior Publication Data

US 2011/0302132 A1 Dec. 8, 2011

Related U.S. Application Data

(60) Provisional application No. 61/351,839, filed on Jun. 4, 2010.

(51) Int. Cl.
G06F 17/30 (2006.01)
G06Q 10/06 (2012.01)

(52) U.S. Cl.
CPC ......... *G06F 17/3056* (2013.01); *G06Q 10/06* (2013.01)

(58) Field of Classification Search
CPC .................................................. G06F 17/3056
See application file for complete search history.

(56) References Cited

U.S. PATENT DOCUMENTS

| | | | |
|---|---|---|---|
| 6,078,982 A * | 6/2000 | Du et al. ...................... 710/200 |
| 7,065,566 B2 | 6/2006 | Menard et al. | |
| 7,213,022 B2 | 5/2007 | Whelan et al. | |
| 7,533,008 B2 | 5/2009 | Mangino et al. | |
| 8,782,020 B2 * | 7/2014 | Karimisetty et al. ......... 707/694 |
| 2001/0011295 A1 * | 8/2001 | Kobayashi et al. .......... 709/201 |
| 2001/0046209 A1 * | 11/2001 | Glassman ...................... 370/230 |
| 2001/0056422 A1 * | 12/2001 | Benedict et al. ............... 707/10 |
| 2002/0062241 A1 * | 5/2002 | Rubio et al. .................... 705/10 |
| 2002/0194181 A1 * | 12/2002 | Wachtel .......................... 707/10 |
| 2003/0004770 A1 * | 1/2003 | Miller et al. ...................... 705/8 |
| 2003/0004771 A1 * | 1/2003 | Yaung ............................... 705/8 |
| 2003/0005406 A1 * | 1/2003 | Lin et al. ........................ 717/102 |
| 2003/0023773 A1 * | 1/2003 | Lee et al. ....................... 709/328 |
| 2003/0050797 A1 * | 3/2003 | Brandt et al. ..................... 705/2 |

(Continued)

FOREIGN PATENT DOCUMENTS

| | | |
|---|---|---|
| CN | 1526106 A | 9/2004 |
| CN | 101055639 A | 10/2007 |

(Continued)

OTHER PUBLICATIONS

Muthuvelu, Swami. International Search Report of PCT/US2011/038531. 2011. <http://patentscope.wipo.int/search/en/WO2011153130>.*

(Continued)

*Primary Examiner* — Syed H Hasan

(74) *Attorney, Agent, or Firm* — Symbus Law Group, LLC; Clifford D. Hyra

(57) ABSTRACT

A computer-implemented method and system to integrate workflow and database transactions is provided. Also provided is a computer readable storage medium that includes a program. The computer-implemented method includes assigning a data structure stored in a database to one or more workflow processes. The computer-implemented method also includes automatically creating an instance of the workflow in response to the data structure being populated with a new record.

18 Claims, 10 Drawing Sheets

DATABASE-WORKFLOW TRANSACTION

(56) References Cited

U.S. PATENT DOCUMENTS

| | | | |
|---|---|---|---|
| 2003/0074342 A1* | 4/2003 | Curtis | 707/1 |
| 2003/0115545 A1* | 6/2003 | Hull et al. | 715/500 |
| 2003/0149714 A1* | 8/2003 | Casati et al. | 709/100 |
| 2003/0172020 A1* | 9/2003 | Davies et al. | 705/36 |
| 2003/0177046 A1* | 9/2003 | Socha-Leialoha | 705/7 |
| 2003/0191769 A1* | 10/2003 | Crisan et al. | 707/100 |
| 2004/0015369 A1* | 1/2004 | Kim et al. | 705/1 |
| 2004/0049481 A1* | 3/2004 | Blevins | 707/1 |
| 2004/0078373 A1* | 4/2004 | Ghoneimy et al. | 707/10 |
| 2004/0111302 A1* | 6/2004 | Falk et al. | 705/4 |
| 2004/0177075 A1* | 9/2004 | Rangadass | 707/10 |
| 2004/0260590 A1* | 12/2004 | Golani et al. | 705/8 |
| 2005/0015771 A1 | 1/2005 | Bagsby | |
| 2005/0234889 A1 | 10/2005 | Fox | |
| 2006/0101328 A1* | 5/2006 | Albornoz et al. | 715/512 |
| 2006/0149698 A1* | 7/2006 | Haselden et al. | 707/1 |
| 2006/0206538 A1* | 9/2006 | Veazey | 707/202 |
| 2006/0277024 A1* | 12/2006 | Kloppmann et al. | 703/22 |
| 2007/0150480 A1* | 6/2007 | Hwang et al. | 707/10 |
| 2007/0156487 A1* | 7/2007 | Sanabria et al. | 705/8 |
| 2007/0162324 A1 | 7/2007 | Suzuki et al. | |
| 2007/0260619 A1 | 11/2007 | Whelan et al. | |
| 2008/0263051 A1 | 10/2008 | Kanyetzny et al. | |
| 2008/0270477 A1 | 10/2008 | Starkey et al. | |
| 2009/0070362 A1 | 3/2009 | Guizar | |

FOREIGN PATENT DOCUMENTS

| | | |
|---|---|---|
| JP | 2000172770 A | 6/2000 |
| JP | 200273929 A | 3/2002 |
| WO | WO01/03037 A2 | 1/2001 |
| WO | WO2007078668 A1 | 7/2007 |

OTHER PUBLICATIONS

MCL Systems. http://web.archive.org/web/20090130003756/http://mclsystems.com/. 2009.*

Saganich, A. (2004). BEA WebLogic workshop 8.1 kick start simplifying Java web applications and J2EE (p. 142-143). Indianapolis, Ind.: Sams.*

Shankar et al., Integrating Databases and Workflow Systems. 2005. <http://dl.acm.org/citation.cfm?id=1084808>.*

Eder et al., Workflow Management and Databases. 1996. <http://citeseerx.ist.psu.edu/viewdoc/summary?doi=10.1.1.21.9113>.*

Japanese Office Action dated Mar. 31, 2015 with English Translation.

Chinese Master Dissertation "Design and Implementation of the Database-Engine Workflow Engine," by Zhou Chen, published Apr. 14, 2009.

Chinese Search Report dated Apr. 3, 2015.

European Search Report dated Nov. 25, 2016.

Korean Office Action dated Feb. 20, 2017

* cited by examiner

Table 502: Effect of database table transaction on workflow transaction

| Database Base table Transaction | Workflow Transaction |
|---|---|
| Insert | Insert, if the base table condition is satisfied<br><br>None, if the base table condition is not satisfied |
| Update | Update of primary key will result in forcing database transaction to fail, if the record is in workflow.<br><br>Update of non-primary key fields has no effect on workflow transaction. |
| Delete | Delete from workflow, if exist |

Table 504: Effect of workflow transaction on database table transaction

| Workflow Transaction | Database Base table Transaction |
|---|---|
| Insert, by reinstating an existing database record into workflow. | None |
| Update, when moving from one state to another state. | None |
| Delete, when the record has reached END state. | None |

FIGURE 5

WORKFLOW ENABLEMENT AND PROCESS DESIGN

DATABASE-WORKFLOW TRANSACTION

WORKFLOW TRANSACTION

WORKFLOW EVENT

WORKFLOW EVENT USING SERVICE BROKER

INTEGRATED WORKFLOW AND DATABASE TRANSACTIONS

CROSS-REFERENCE TO RELATED APPLICATIONS

This application claims the benefit of U.S. provisional application Ser. No. 61/351,839 filed Jun. 4, 2010, which is herein incorporated by reference.

BACKGROUND

1. Field of the Invention

The present invention relates generally to the field of Business Process Management ("BPM") and Workflow Management, the computer software industry, and relational database technology.

2. Description of Related Art

Most business applications run on relational databases such as Oracle DB2, or Microsoft SQL Server. Business Process Management (BPM), also known as workflow management, is a fast-evolving concept, which is adopted by organizations to formulate a process-oriented approach to completing a task. The several software solutions that implement BPM solutions work either as standalone software or in combination with other software platforms such as databases, operating systems, and third party software through use of Application Programmatic Interfaces (APIs), Common Line Interfaces (CLI), and other interfaces in an n-tier architecture. Many BPM software solutions are evolved from document, image, and email management systems—all of which revolve around the concept that when a subject matter ("document" or "file" or "email" or "record") is created, a process controls the subject matter from start to end. Attempts to integrate database and workflow solutions have involved the loose coupling of different software platforms as custom solutions for specific business needs.

SUMMARY OF EMBODIMENTS OF THE INVENTION

In one embodiment of the invention, a computer-implemented method is provided. The computer-implemented method includes assigning a data structure stored in a database to one or more workflow processes. The computer-implemented method also includes automatically creating an instance of the workflow in response to the data structure being populated with a new record.

In another embodiment of the invention, a computer readable storage medium including a program, which when executed on a processor performs an operation is provided. The operation includes assigning a data structure stored in a database to one or more workflow processes. The operation also includes automatically creating an instance of the workflow in response to the data structure being populated with a new record.

In yet another embodiment of the invention, a system is provided. The system may include a processor and a memory comprising a program, which, when executed by the processor, is configured to perform an operation. The operation includes assigning a data structure stored in a database to one or more workflow processes. The operation also includes automatically creating an instance of the workflow in response to the data structure being populated with a new record.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which:

FIG. 5 illustrates a block diagram of two tables that show the relationship between database transactions and workflow transactions according to one embodiment of the present invention;

Figure 1:
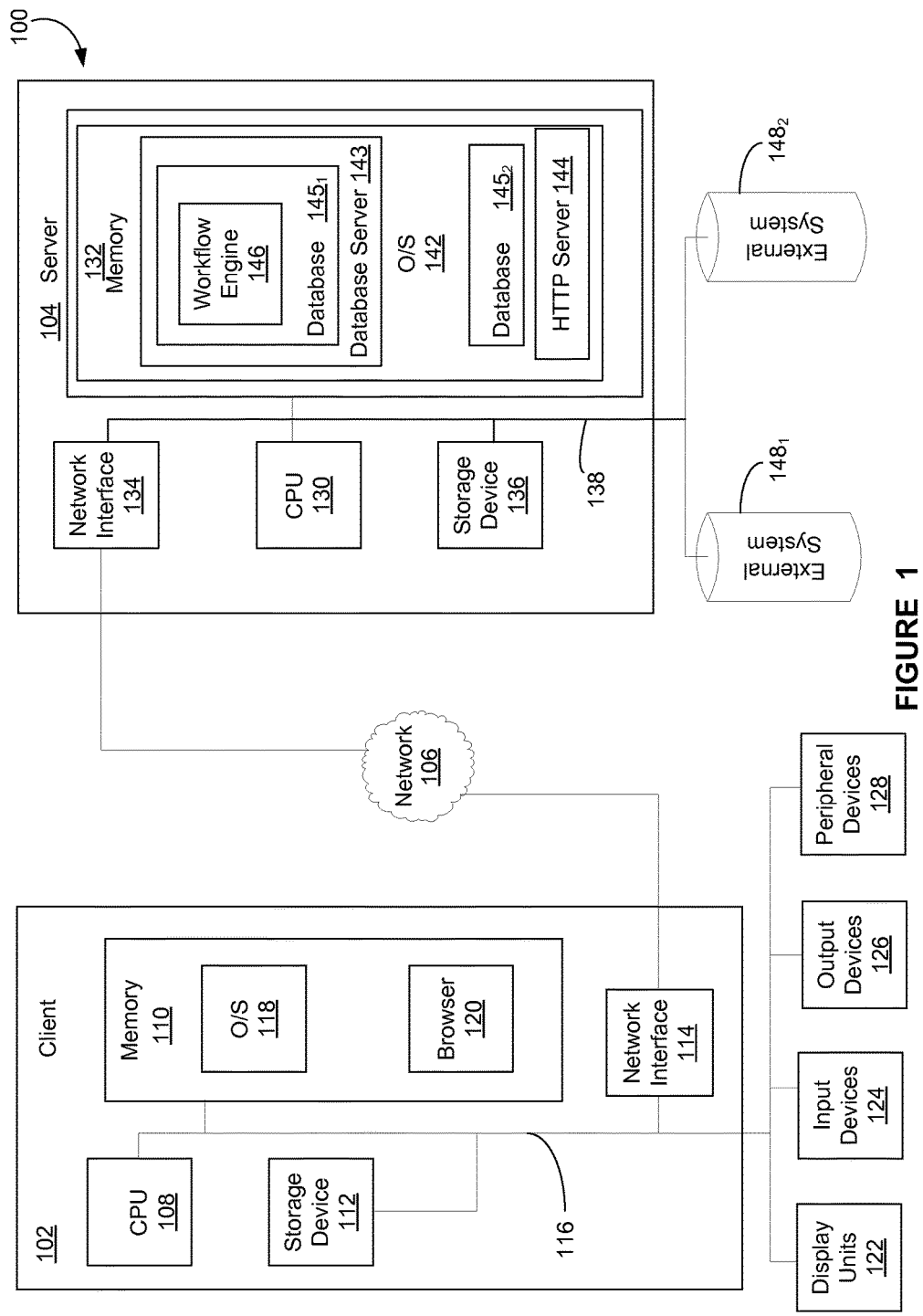
FIG. 1 shows a block diagram illustrating an exemplary computing environment according to one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

Embodiments of the present invention will now be described with reference to the attached figures. Various structures, connections, systems and devices are schematically depicted in the drawings for purposes of explanation only and so as to not obscure the disclosed subject matter with details that are well known to those skilled in the art. Nevertheless, the attached drawings are included to describe and explain illustrative examples of the present invention.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

One embodiment of the invention is implemented as a program product for use with a computer system such as, for example, the computing environment 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, database, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature. In this regard, references to particular definitional and programming languages, such as HTML, XML, SQL, .NET, C#, etc. are merely illustrative. It is broadly contemplated that the invention is applicable regardless of the particular schema or language used to defined network resource content.

Turning now to FIG. 1, a block diagram illustrating an exemplary computing environment 100, in accordance with an embodiment of the present invention, is shown. In general, the computing environment 100 includes a client (e.g., a user's) computer 102, and a server computer 104. The client computer 102 and the server computer 104 may be components of the same computer system or may be connected via a network 106, such as the Internet. As shown, the client computer 102 includes a central processing unit (CPU) 108 connected to a memory 110, a storage device 112, and a network interface 114 via a bus 116. The CPU 108 is included to be representative of a single CPU, multiple CPUs, a single CPU having multiple processing cores, and the like. The storage device 112 stores application programs and data for use by the client computer 102. Examples of the storage device 112 include one or more hard-disk drives, flash memory devices, optical media and the like. The client computer 102 may be connected to the data communications network 106 (e.g., a local area network, which itself may be connected to other networks such as the internet) using the network interface 114. The memory 110 can be one or a combination of memory devices, including random access memory, nonvolatile or backup memory (e.g., programmable or flash memories, read-only memories, etc.). Illustratively, the memory 110 of client computer 102 stores an operating system 118 used to manage hardware and software executing on the client computer 102. As shown, memory 110 also includes a browser program 120 which, when executed by CPU 108, provides support for navigating between various servers and locating network addresses at one or more of servers (e.g., server computer 104).

The client computer 102 may be connected to one or more display units 122, input devices 124, output devices 126 and peripheral devices 128. The display units 122 may be internal or external monitors, television screens, handheld device displays, and the like. The input devices 124 may be any one of a keyboard, mouse, track-ball, stylus, mouse pad, mouse button, joystick, scanner or the like. The output devices 126 may be any one of a monitor, printer, plotter, copier or other output device. The peripheral devices 128 may be any other device which can be coupled to a computer: a CD/DVD drive capable of reading and/or writing to physical digital media, a USB device, Zip Drive, external floppy drive, external hard drive, phone and/or broadband modem, router/gateway, access point and/or the like.

Similar to the client computer 102, the server computer 104 may include a CPU 130, a memory 132, a network interface device 134, and a storage device 136, coupled via a bus 138. The memory 132 may be a random access memory sufficiently large to hold the necessary programming and data structures that are located on the server computer 104. As shown, the memory 132 stores an operating system 142 used to manage server hardware and software executing on the server computer 104. Illustratively, the memory 132 also includes a hypertext transfer protocol (http) server 144 configured to service requests from the client computer 102. For example, the http server 144 may respond to requests for access to electronic resources (e.g., HTML documents, network information, and the like) residing on the server computer 104. The memory 132 may also include a database server 143, which may respond to request for access to database applications queries and the like. However, one of ordinary skill in the art will recognize that the database server 143 or http server 144 is merely illustrative and embodiments of the invention may be adapted to support both known and unknown protocols. The programming and data structures of the http server 144 may be accessed and executed by the CPU 130 as needed during operation. The server computer 104 may connect to the network 106 using the network interface device 134 (e.g., an analog modem, a wired network card, or a wireless network device).

In one embodiment, users may interact with the server computer 104 using a graphical user interface (GUI). In a particular embodiment, GUI content may comprise HTML documents (i.e., web pages) rendered on the display unit 122 coupled with the client computer 102 using the browser 120.

In one embodiment, the web pages may include pages that allow a user to design, manipulate, execute and monitor the performance of various business processes (i.e., workflows).

The database server 143 may include a plurality of databases $145_1$, $145_2$. Database $145_1$ may host a workflow engine 146. The workflow engine 146 may comprise a software application configured to provide the ability (e.g., via the GUI) to model a workflow (e.g., define processes, states, tasks, actions, events, rules, etc.) in order to control the work activities associated with a database or databases. The databases $145_1$, $145_2$ may include a relational database $145_1$ that is queried using an SQL query, or an XML database $145_2$ queried using an XML query. The invention, however, is not limited to any particular physical database storage mechanism and may readily be extended to operate on other such mechanisms, whether currently known or unknown. While the databases $145_1$, $145_2$ are illustrated as being internal to the server system, it is noted that the databases $145_1$, $145_2$ may exist on an external storage device (e.g., storage device 136) of the server computer 104, or may be accessed over the network 106.

Figure 2:
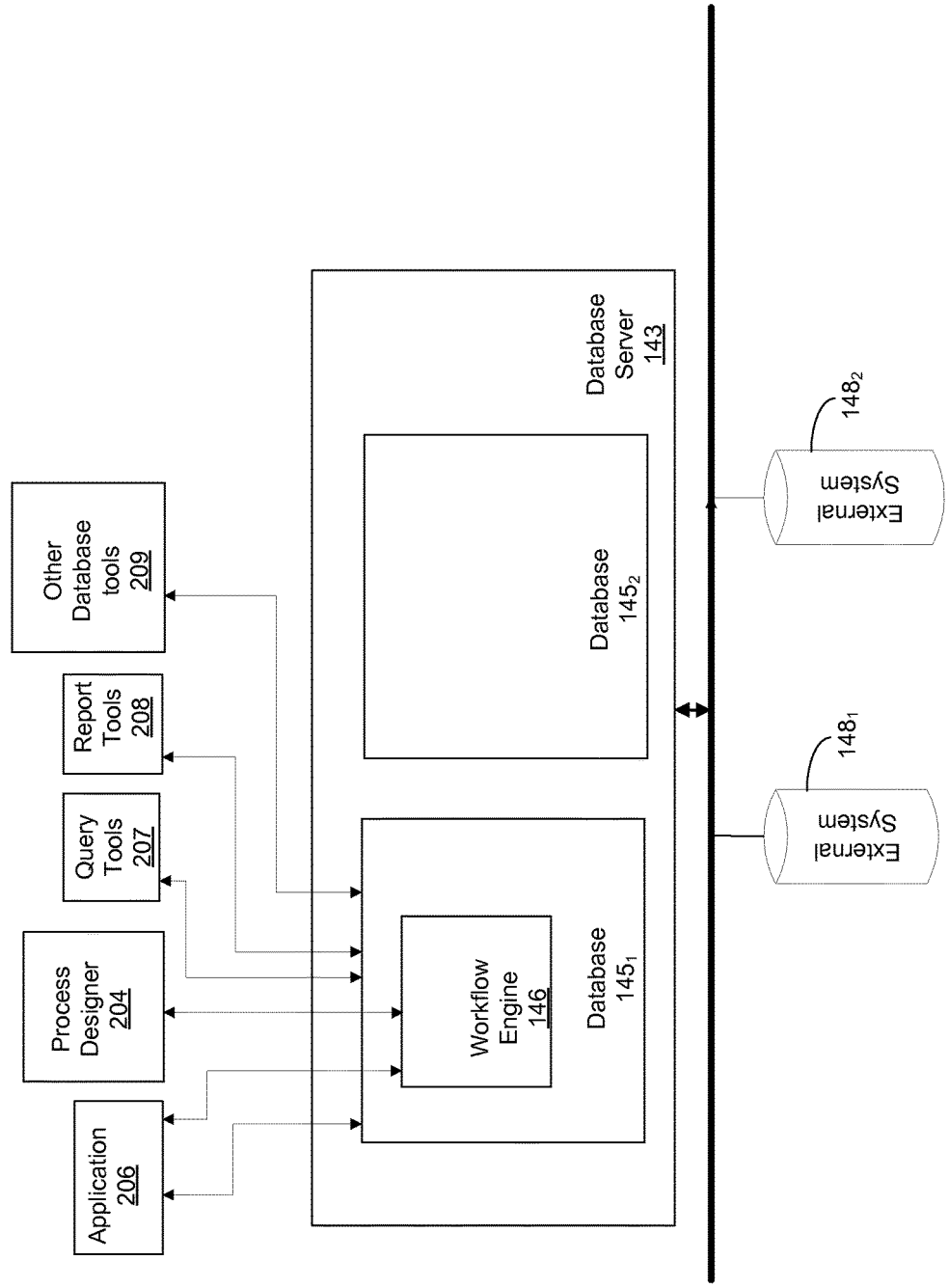
FIG. 2 shows a block diagram of an exemplary implementation of a workflow engine according to one embodiment of the present invention.

Turning now to FIG. 2, a diagram of an exemplary implementation of the workflow engine 146, in accordance with an embodiment of the present invention, is illustrated. The workflow engine 146 resides in the database $145_1$. The process database $145_1$ resides in the database server 143. As shown, a workflow process designer 204, a business software application 206, database query tools 207, database reporting tools 208 and other database tools 209 are coupled to the database $145_1$. In one embodiment, the database server 143 may be a database management system (DBMS), which controls the creation, maintenance, and the use of the databases $145_1$, $145_2$. The databases $145_1$, $145_2$ relate to a logical unit where data, procedures, and security are separated for use by one or more related applications. The database server 143 may also be coupled to external systems $148_1$, $148_2$, which may be third party systems that are directly controlled or orchestrated by workflow engine 146 through use of programmable features within the database $145_1$ and/or use of software features available in the database server 143 or features available in the O/S 142 (as shown in FIG. 1). In one embodiment, a Service Broker feature (not shown) available in many leading database servers known in the art is used for orchestration.

It is noted that orchestration refers to an automated arrangement, coordination, and management of complex computer systems, middleware, and services. In an orchestration operation, messages are exchanged between the loosely connected systems that work together to accomplish a task. As an example, a third party shipping company may be sent a message to ship a product to an address. The shipping company independently performs the shipping and confirms the shipment details to the requestor. The company that requests shipping does not care about the shipping logistics, and the shipping company does not care about the shipping purpose. Messages are simply exchanged between the two companies systems to accomplish the shipping task in an independent manner.

The process designer 204 allows a user (e.g. via the GUI presented through the browser 120 (shown in FIG. 1)) to create and modify a workflow process. Using the GUI, the user may define, edit, review, and manage the workflow processes. When a workflow process is created with process designer 204, a table (or a data structure) in the database $145_i$ is defined as the controlling table ("base table") for a process. The flow of data into the base table triggers the workflow engine 146. An instance of data flowing into the base table (a record of a table) initiates an instance of a workflow. A base table may be a controlling table for more than one process, and hence an instance of data flowing into the base table could initiate many instances of workflow, one for each process. Alternatively stated, workflow transaction(s) are initiated as part of a database transaction to the base table.

Generally, workflows consist of three basic elements: processes, states, and transitions. A workflow process is a sequence of a flow of work to complete a task. The flow may take different routes at different points, depending on conditions set by the process designer 204. A large task may be logically divided into many interconnected sub-processes. A state is a resting step in a workflow process. A transition is an action that moves a workflow instance from one state to the next state. Transitions are either a specific user action or an automated flow based on specific conditions set by the user. Using the GUI, the user may define the states and the associated transitions of the workflow being modeled. In one embodiment, the workflow may be modeled as a high-level flowchart diagram (shown in FIG. 4), which enables the user to logically describe the activities as a process. In one embodiment, the user may create the flowchart by performing "drag and drop" manipulations of icons. The process designer 204 interacts with the workflow engine 146. All workflow process definitions ("workflow metadata") are stored as data with the database $145_1$.

The application 206 is a business application to transact the business for which the software is designed to support. As an example, software for customer order management application for a mail order operation is a business application. It may have screens for creating orders, shipping orders, and billing the customer. Such an application may be built with workflow capability or without it. A non-workflow application may not have the workflow engine 146 within a database as in $145_2$. A workflow-enabled application works like any software application, however with additional controls from the workflow engine 146. The application may be enhanced to a workflow-aware application, where the application 206 interacts with the workflow engine 146 and utilizes the workflow features. As an example, the workflow-enhanced application may show the workflow state(s) of all open orders. The workflow-enhanced application may delegate and prioritize work to the users. The workflow-enhanced application may also control what user can do what work and provide coordination between users, etc.

As previously mentioned, the workflow engine 146 resides in the database $145_1$ and is integrated with database $145_1$ and database server 143. The integration is achieved by implementing workflow engine 146 as programs residing in a database layer of the database $145_1$. Such integration provides the workflow engine 146 with the ability to control the workflow process as the new data comes into the database $145_1$, or when the data is modified and/or deleted. The integration provides a transparent use of the database functionality (i.e., with no knowledge of presence of the workflow engine 146.) However, the integration includes workflow control. Workflow processes are instantiated, guided, and controlled with the changes to the data in the base table residing in database $145_1$. Any changes to the data in the database $145_1$ by the application 206, database query tools 207, database reporting tools 208 and many other database tools 209 is automatically probed and controlled by workflow engine 146. The integration provides a seamless implementation of the workflow engine 146 within the database $145_1$ layer.

The workflow engine 146 may provide the creation and management of workflow processes, interpret models of the workflow, and manage workflow execution. The workflow engine 146 may also route flows and synchronizes activities, assign resources to activities, notify individuals, invoke events and applications, transmit data and documents to applications and individuals, control user security and privileges, maintain the information of various states of various workflow instances, and maintain a log of workflow transactions.

Figure 3:
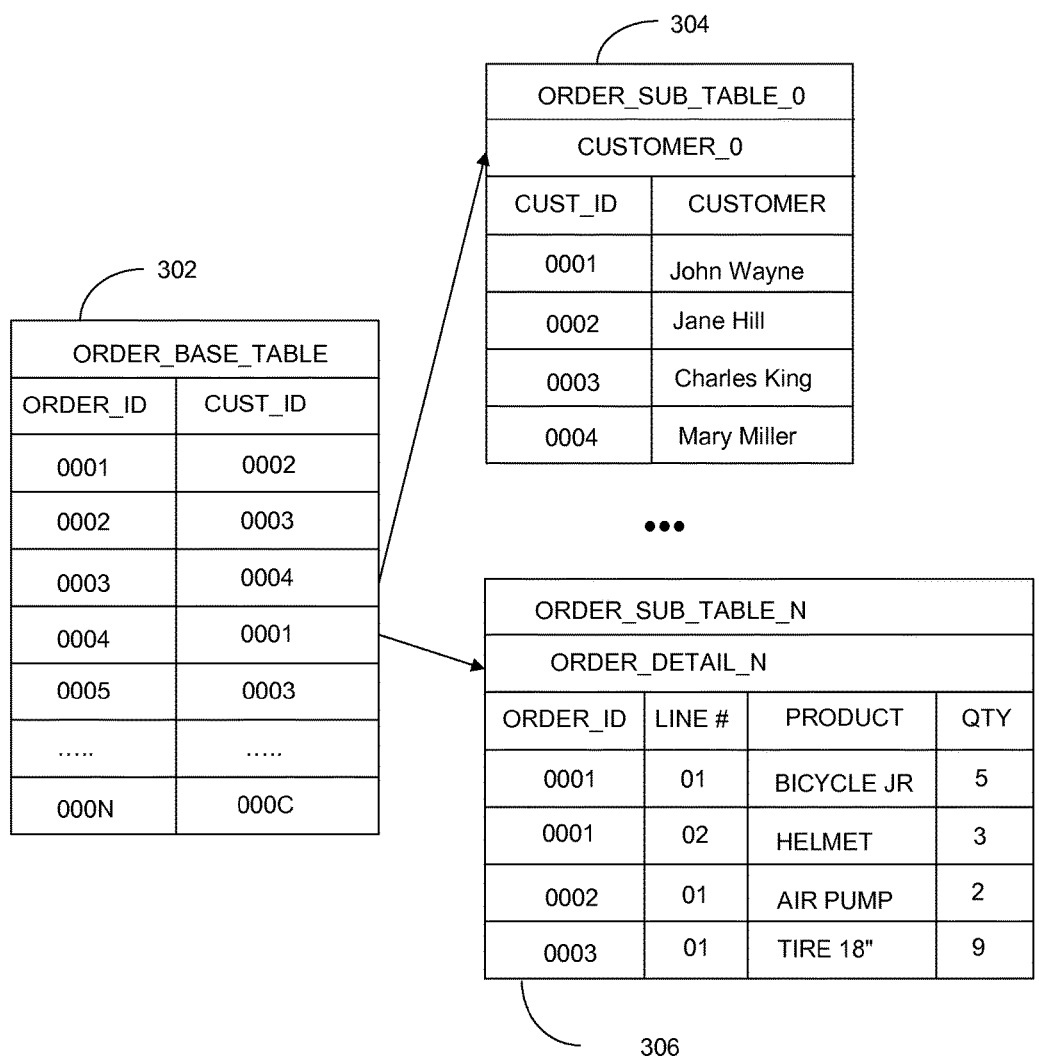
FIG. 3 illustrates a block diagram of an exemplary base table and sub-tables according to one embodiment of the present invention.

Turning now to FIG. 3, a block diagram of an exemplary base table and sub-tables, in accordance to an embodiment of the invention, is shown. Generally, data for a business, organization, entity, or the like may be stored in several related tables 302, 304, 306 in the appropriate database $145_1$, $145_2$. One such table is the base table 302, which typically contains a plurality of rows, each containing a record. Putting the base table in the context of an order management application, each record in the base table may represent an order placed using the application. As shown, each record may contain the order identification number of each order placed. The base table 302 may have an N number of associated sub-tables 302, 304. Each sub table 302, 304 may contain additional information about each order placed. As shown, sub table 304 contains the name of the customer for each order placed, and sub table 306 contains the quantity of the item purchased for each order. In one embodiment, the workflow is initiated once the base table 302 is populated with a new record. Thus, each row of the base table 302 may also represent an occurrence of a workflow process (e.g. an order management process as defined by the workflow). The application 206 may be configured to create or modify data stored within the base table 302 (or one its sub-tables 304, 306). The application 206 may utilize a user interface to input or modify data, provide reporting capability, and the like.

The workflow may also be associated with internal and external systems $148_1$ and $148_2$. For example, consider a business model where the customer is credited with frequent buyer points for a purchase. In this case, the customer frequent buyer point system that is credited with points may be an internal system. However, it is a different application that uses the database $145_2$. In another example, a third party shipping company may be used for drop shipments of customer orders. The shipment company system (e.g., external systems 148 and/or $148_2$) may be notified with shipment details. The shipping company may perform the shipping task and sends confirmation details. The interaction with internal and external systems is accomplished through workflow events. Workflow events may be specified in scripts using any programmable language (e.g., C#, Java, and the like). The event scripts may be executed by the workflow engine 146 as part of the database-workflow integrated transaction or just as part of workflow transaction. The events may be set to execute at appropriate places, such as when entering a state, exiting a state, or when a user performs an action. The events include, but are not limited to, creating files, initiating actions in other systems and/or applications, sending e-mail notifications, and the like.

Figure 4:
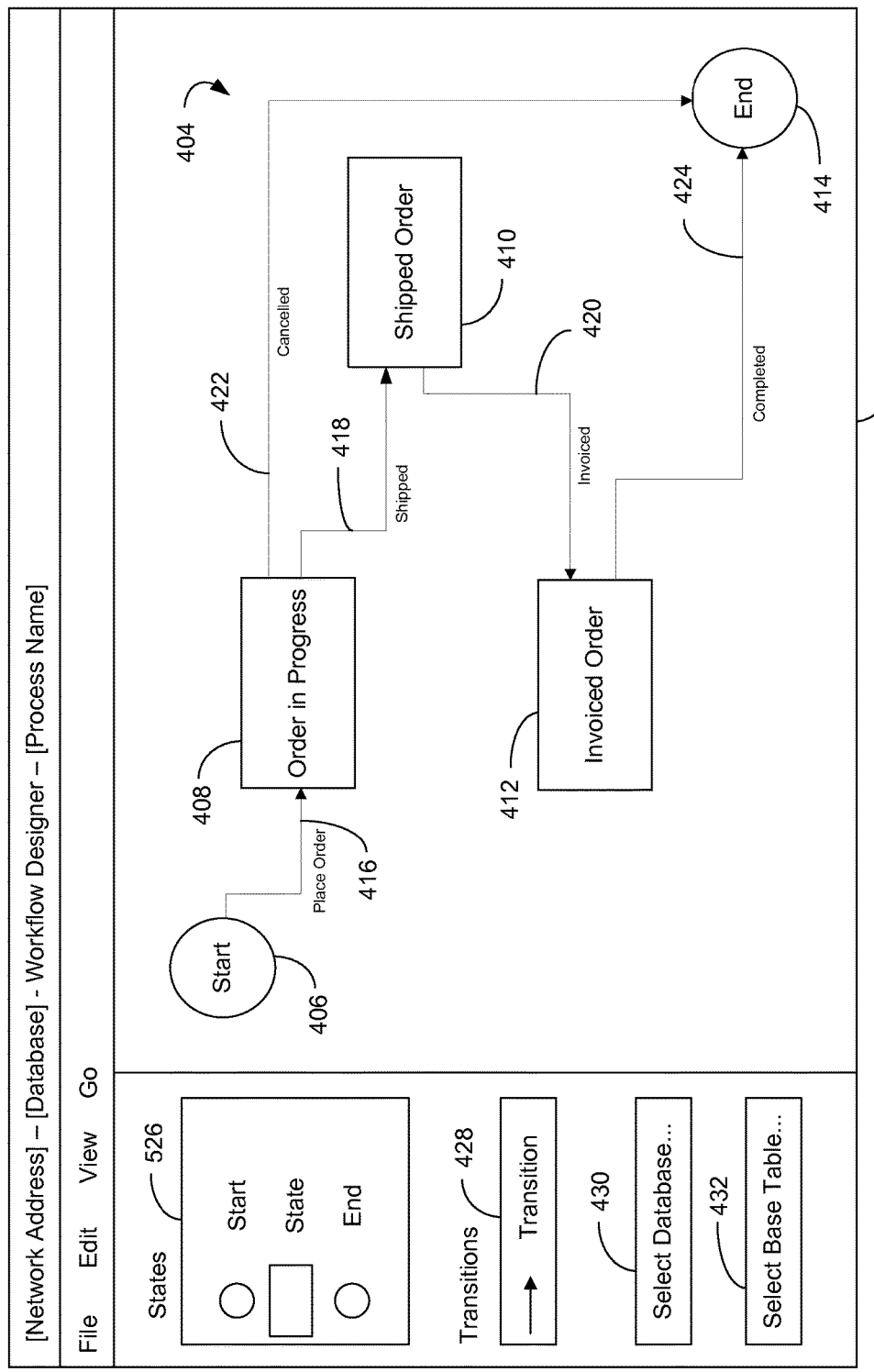
FIG. 4 illustrates a graphical user interface screen for designing and managing a workflow process according to one embodiment of the present invention.

Turning now to FIG. 4, graphical user interface screen 402 for designing and managing a workflow process 404, in accordance to an embodiment of the invention, is illustrated. For illustrative purposes, the workflow process 404 shown is for an order management process. As shown, the order management process may comprise a plurality of states: Start 406, Order in Progress 408, Shipped Order 410, Invoiced Order 412, and End 414. The states 406, 408, 410, 412, 414 may be coupled to each other with a plurality of transitions: Place Order 416, Shipped 418, Invoiced 420, Cancelled 422, and Completed 424. The workflow process 404 may be configured so that it enters the Order in Progress state 408 when a purchaser places an order (e.g., via a web form) for a product. Depending on the action taken during this state, the workflow 404 may transition from the Order in Progress state 408 to the End state 414 or the Shipped Order state 410. For example, if the order is cancelled (e.g., by a supplier) then the workflow process 404 may transition from the Order in Progress state 408 to the End state 414 via the Cancelled transition 422. In this case, the supplier may utilize a user form that initiates an event when the order is cancelled, which causes the workflow to follow the Cancelled transition 422. However, if the product is shipped, then the workflow process 404 may transition from the Order in Progress state 408 to the Shipped Order state 410. In this case, the user form may initiate an interaction that when the order is shipped, workflow to perform the Shipped transition 418. Upon invoicing the order (e.g., using a user form), the workflow process 404 may transition from the Shipped Order state 410 to the Invoiced Order state 412 via the Invoiced transition 420. Upon completing the order, the Invoiced Order state may transition to the End state via the Completed transition 424.

The states 406, 408, 410, 412, 414 and transitions 416, 418, 420, 422, 424 may be implemented as part of the workflow 402 by dragging and dropping the states and transitions using the icons in the States 426 and the icons in the Transitions box 428.

As previously stated, the workflow process 404 is associated with data stored in a base table in a database $145_1$, $145_2$. In one embodiment, a user may select the appropriate database $145_1$, $145_2$ using the Select Database button 430. Using the example above, the workflow process 404 for the order management process may be created using the Select Base Table 432 button, which associates the base table 302 (shown in FIG. 3) containing order information (e.g., order identification numbers). Orders (workflow instances) may be created by a variety of tools, including an order processing application 206, query tool, or any other compatible application. Workflow instances are created regardless of what tool is used.

In one embodiment, during the association of base table 302 to a workflow process 404, the workflow engine 146 creates table level triggers on the base table. Such triggers act as gateways to the workflow engine 146. When a record is added, updated and deleted in the base table, the workflow engine 146 gets control through the table triggers. When the workflow engine 146 obtains control, it identifies the record using the primary key of the record and completes the workflow transaction. Thus, a workflow transaction is completed as part of database transaction. Once the base table 302 is populated with a record for a new order, an instance of the workflow process 404 may be automatically created for this order. In this case, when the workflow process 404 is initiated, it may be configured to automatically and/or conditionally transition from the Start state 406 to the Order in Progress state 408 once the base table 302 is inserted with a newly-placed order.

Once the user designs the desired workflow process 404, the workflow capability may be incorporated into an existing or new application (e.g., a web-based order placing application). For example, a user may create web forms (e.g., using Microsoft Visual Basic.NET) and associate the web forms with the database $145_1$, $145_2$. Using the browser 122, a plurality of web forms may be created, each having a different purpose. For instance, one particular web form may be used to submit an order for a product. As such, the web form may contain various fields that accept information regarding the order (e.g., shipping address, billing address, product name, quantity, etc.). When a user submits the form, an entry representing the newly-placed order is created in the same base table 302 chosen for the workflow process 404 created. Accordingly, once the entry is created in the base table 302, a workflow process instance may be automatically created for this order. The workflow instance may or may not be created based on the conditions set for the process. As an example, the condition may be set to create a workflow only for the mail orders and not for orders from in-store purchases. When a row is created, a Place Order transition may also be initiated. Accordingly, the Start state 406 may transition to the Order in Progress state 408. The instance of the workflow is identified by the primary key or unique key of the base table. The primary key of a table is a unique identifier for a row of a table. The workflow engine 146 independently maintains the state information of each record in the base table(s) in its own data store consisting of a plurality of tables. For example the workflow engine 146 has the information that ORDER_ID=0001 (primary key) is currently in state 408.

Another type of form that may be created is an order fulfillment and shipment form, which may be utilized by the supplier of the product. The supplier may use this form to either cancel the order, or fulfill the product or products ordered (i.e., ship the order). The form, when submitted, may initiate an event that notifies the workflow engine 146 to move the workflow process 404 from the Order in Progress state 408 to the appropriate state. For example, if the supplier cancels the order, then a Cancelled transition event may be initiated, which causes the workflow process 404 to move from the Order in Progress state 408 to the End state 414. In one embodiment, upon submitting the order fulfillment and shipment form, a function may be called that signals the performing of Cancelled transition 422 that directs the workflow engine 146 to move the workflow 404 from the Order in Progress state 408 to the End state 414. On the other hand, if the supplier fulfills the order, then a Shipped transition 418 may be initiated, which causes the workflow process 404 to move from the Order in Progress state 408 to the Shipped Order state 410. In one embodiment, upon submitting the order fulfillment and shipment form, a function may be called that directs the workflow engine 146 to move the workflow process 404 from the Order in Progress state 408 to the Shipped Order state 410.

The records in the base table and the data in the base table are independent of workflow engine 146. In one embodiment, the workflow engine 146 has no say on what data can be entered in the base table. In this case, the workflow engine 146 independently guides and monitors the state information of the records of the base table using the primary key. The state information is stored separately within the workflow engine 146 data store. By separating the workflow data from the base table data, the application 206 and the database $145_1$ behave independently and transparently of the workflow. Yet, the full functionality of the workflow is provided by the workflow engine 146.

The workflow engine 146 is active on the records of the base table that is currently in any of the states in the process (408, 410, and 412). The Start state 406 and End State 414 are transient states and a base table record may not "rest" on this state. When a base table record reaches the End state 414, the record is removed from the workflow queue, and the workflow engine 146 stops tracking the record. On reaching the End State, the Order is completed (or cancelled) and no further work is required on this order. The base table continues to have the data about the completed order. The base table data remains under the control of the application 206. In another embodiment, it is also possible to bring a completed order back into the workflow by making a "reinstate" request to the workflow engine 146 with the use of primary key of the base table and the current state where the record should be placed.

When a base table record's data is updated through application 206, or query tool 207, or other database tools 209, the change to the record's data other than primary key may have no effect on the workflow instance. In one embodiment, the workflow engine 206 may enforce the inability to update the primary key if the record is actively in the workflow (e.g., if the current state of the record is 408 or 410 or 412), as primary key is used in the workflow engine for tracking the current state. In another embodiment, the workflow engine 146 automatically adjusts the workflow instance key to match with the changed database primary key, thereby allowing updates to the primary keys. Regardless of the approach used, a record can be updated without restriction, providing full independence to the application 206 with limited interference from workflow engine 146.

When a base table record is deleted through application 206, or query tool 207, or other database tools 209, the workflow engine 146 examines the record's primary key and also deletes it from the workflow queue if it remains actively in the workflow (e.g., if the current state of the record is 408 or 410 or 412).

A base table insert initiates a workflow instance and transaction. However, there could be many subsequent workflow transactions with no change to the base table record. Workflow transactions happen when there is a change from one state to another state.

The above description is summarized in FIG. 5. Turning now to FIG. 5, a block diagram of two tables 502, 504 that show the relationship between database and workflow transactions, is shown. Table 502 shows the effects of a database transaction on a workflow transaction. Table 504 shows the effects of workflow transaction on a database transaction. As shown in Table 502, database transaction on the base table initiates a workflow transaction. For example, if the database transaction is an insert transaction, and insert transaction is performed on the workflow transaction if the base table condition is satisfied. If the database transaction is an update transaction to a primary key of a base table, the database transaction will be forced to fail. However, if the update transaction is to a non-primary key, there will be no effect on the workflow transaction. If the database transaction is a delete transaction, the corresponding record's primary key is also deleted from the workflow.

However, as shown in Table 504, a workflow transaction (e.g., for example, an insert, update or delete transaction) does not create any database transactions on the base table. This facilitates a minimally invasive workflow engine 146 to be introduced within an existing or new business application with no change in the architecture of database-based application development.

In another embodiment, integrated database-workflow transaction may be implemented as a database-deferred workflow transaction. From a database transaction perspective, when a row is inserted into a table, a database engine usually sets row level locks or sets table level locks. The lock implementations vary from one database vendor to another. The triggers (created by the workflow engine 146) may be executed very quickly to maintain reasonable performance. The triggers may be fast enough to allow entering hundreds or even thousands of orders in parallel. Many embodiments of this invention allow integration with internal and external systems 148. Such integration has potential for the database transactions to be slowed down or wait indefinitely for a response from other systems. In addition, the flow from one state to another state may be set to automatically flow several states in a loop, and many workflow sub-processes may be created automatically. Such long flows may lock down the system, which may slow down the entire system. Many database implementations have restrictions on nested level triggers and may prevent long nested automated flow of several steps. These issues may generally be overcome with good workflow process design. Referring to Tables 502 and 504, the database-workflow integrated transaction may be relevant in insert and delete database transactions. Most database systems provide row level locks for these transactions and it is unlikely that other users (e.g., other order transactions) may be locked or slowed down. However, there is potential for running out of limits on nested database transaction level and potential for indefinite wait for transaction involving external systems, etc. Such issues may be overcome with database-deferred workflow transaction.

To implement the database-deferred workflow mechanism, the workflow engine 146 may use a Service Broker or any Service Oriented Architecture (SOA) (not shown). The Service Broker or SOA implementations are available with many modern databases known in the art. This provides the capability to delink a task and complete the task independently in a non-locking manner. When the workflow engine 146 receives control from a database transaction, the workflow engine 146 may optionally choose to delegate some or all of a workflow transaction to a Service Broker. After delegating to the Service Broker, the workflow engine 146 may signal to the database engine that a workflow transaction is pending or completed, which then allows the database transaction to be completed, thereby releasing all database locks. However, the workflow engine 146 marks the workflow transaction as pending and prevents the base table record from being moved to other states. When the service broker completes work successfully and notifies the workflow engine 146, the workflow engine 146 releases the lock on this record for further workflow transactions. If the service broker fails to complete the work (e.g., the external systems 148 are unreachable), the service broker may wait and retry. Under some conditions, the previously completed database transaction (related to this erred database-workflow transaction) may be programmatically rolled back to a level as if the initial database transaction did not take place.

Figure 6:
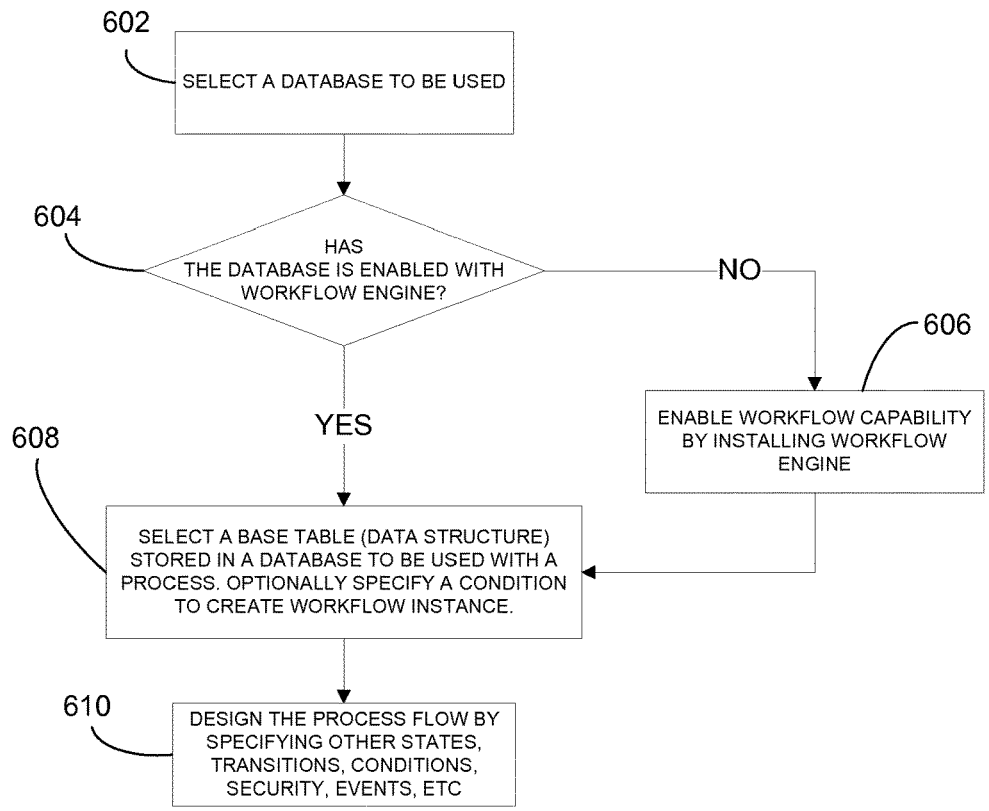
FIG. 6 illustrates a flow chart for workflow engine enablement in a database and creating a process design according to one embodiment of the present invention.

Turning now to FIG. 6, a flowchart for enabling a database for workflow and creating a workflow process, in accordance to an embodiment of the invention, is illustrated. The operations begin at step 602, where a database is selected to be used with a workflow. At step 604, the database is checked to determine if it is already enabled for a workflow. If the database is already enabled, a base table stored in the database is selected for a Process at step 608. This creates a new process on the base table (e.g., the START 406 state, as shown in FIG. 4). The process is then enhanced at step 610 with as many states, transitions, end states, conditions, events, security etc. If, at step 604, it is determined that the database is not enabled for a workflow, then at step 606, workflow capability is enabled by installed the workflow engine 146.

Figure 7:
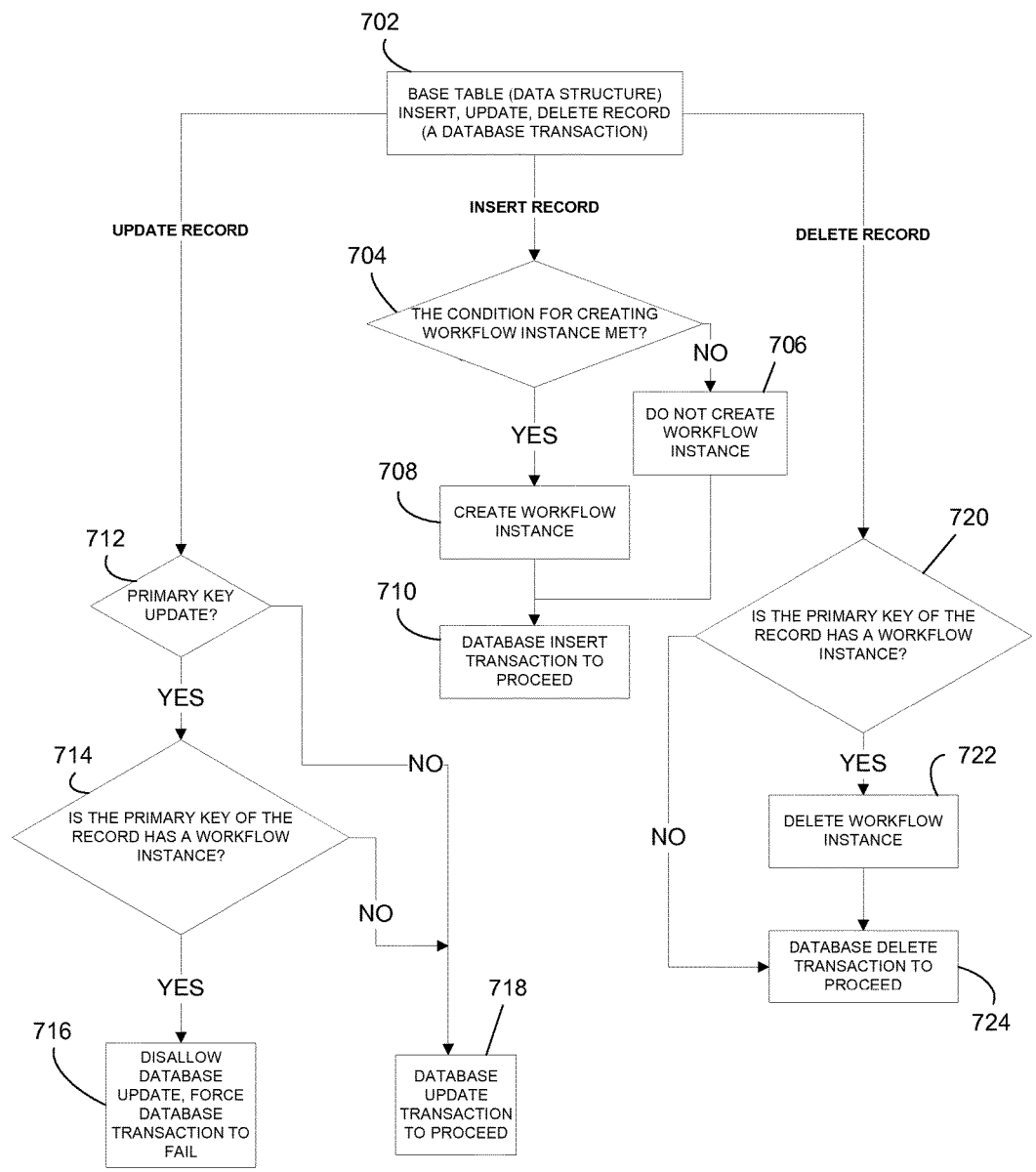
FIG. 7 illustrates a flow chart for performing a database-workflow integrated transaction according to one embodiment of the present invention.

Turning now to FIG. 7, a flowchart for database-workflow integrated transactions, in accordance to an embodiment of the invention, is illustrated. FIG. 7 is a flowchart detailing the transactions shown in Table 502 of FIG. 5. The flowchart illustrates possible database-workflow integrated transactions with database transaction initiated on the base table. The flowchart begins with a database transaction, as in step 702, that is examined by the workflow engine 146 for an insert, update and/or a delete database transaction. At step 704, after determining that the database transaction is an insert record transaction, it is determined if the database transaction meets the condition for creating a workflow instance. If it meets the condition, a workflow instance is created at step 708 and the insert record database transaction is signaled to proceed by the workflow engine 146 at step 710. If it does not meet the condition, no workflow instance is created at step 706, and the database insert transaction is signaled to proceed by the workflow engine 146 at step 710.

At step 712, after it is determined that the database transaction is an update record transaction, the database transaction is examined to determine if the update involves a primary key of the record. If the primary keys are updated, it is further examined at step 714 to determine if the record has a workflow instance. If the workflow instance exists on the primary key, the workflow engine 146 signals the database engine to fail the transaction at step 716. The primary key cannot be updated as the workflow engine 146 tracks the workflow instance with the primary key. In another embodiment, the workflow engine 146 automatically adjusts the workflow instance key to match with the changed database primary key (not shown in flow chart). If the primary key fields are not updated, or if the record is not in workflow, the workflow engine 146 signals the database to allow and complete the database transaction, at step 718.

At step 720, after it is determined that the database transaction is a delete record transaction, the database transaction is examined to determine if the workflow instance exists for the primary key. If it exists, at step 722, the workflow engine 146 deletes the workflow instance, followed by a signal to the database engine to complete the delete database transaction at step 724. If no workflow instance exists, the workflow engine 146 signals to the database engine to complete the delete database transaction at step 724.

Figure 8:
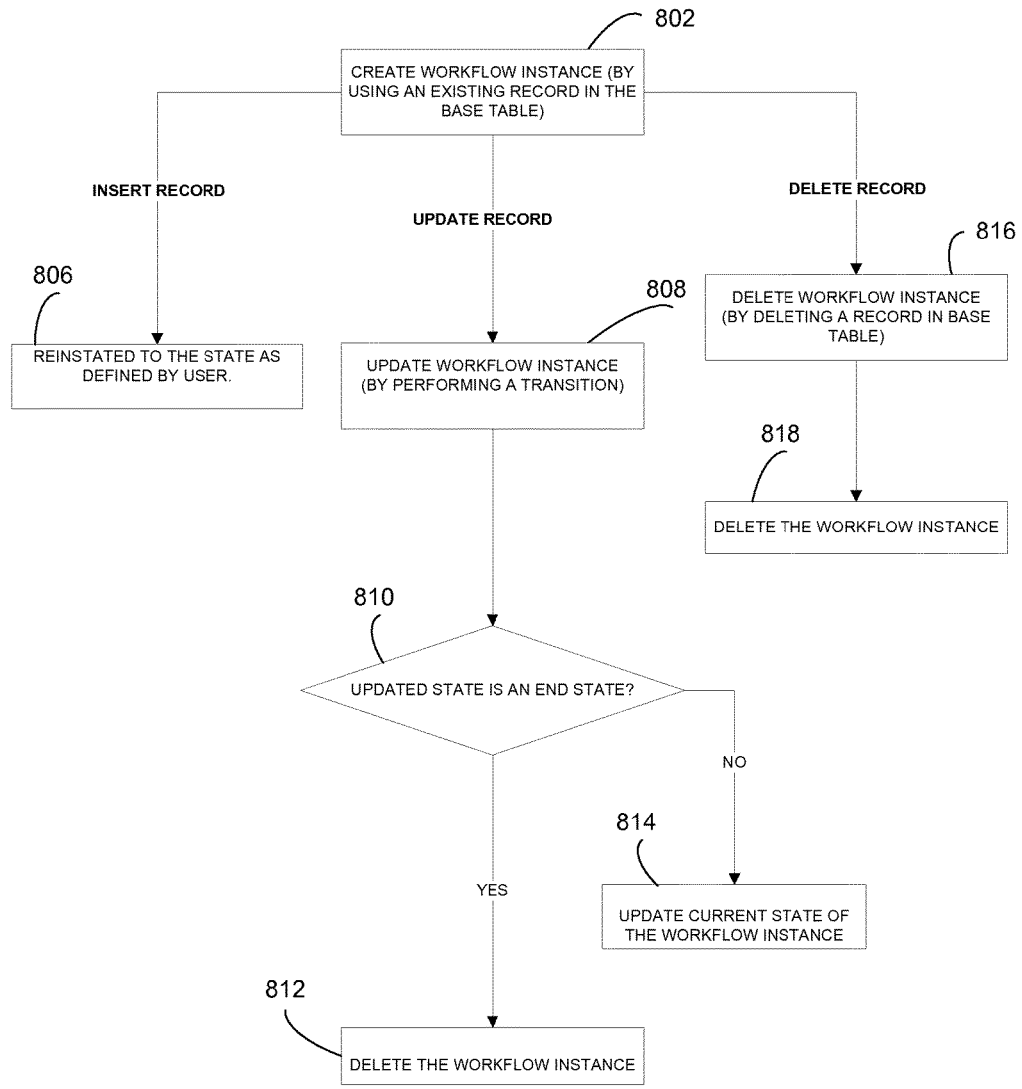
FIG. 8 illustrates a flow chart for performing a workflow only transaction according one embodiment of the present invention.

Turning now to FIG. 8, a flowchart for workflow transaction, in accordance to an embodiment of the invention, is illustrated. FIG. 8 is a flowchart detailing the transactions shown in Table 504 of FIG. 5. This flowchart illustrates possible workflow transactions that are not initiated by a database transaction on the base table. At step 802, a workflow instance 804 may be created by using an existing record in base table that is not currently in workflow. This may be possible when a work record (e.g., an Order) is brought back to redo a workflow. As an example, an incorrectly executed Customer Order may be brought back to a workflow for re-execution. At step 806, during an insert transaction, the workflow engine 146 flows to the reinstated state as defined by the user.

At step 808, during an update transaction, the workflow instance is updated. When updating the workflow instance, one state is moved to another when a user or a machine performs a Transition. At step 810, the workflow engine 146 examines the Transition and determines if the next state is an end state. If it is determined that the next state is an end state, the workflow instance is deleted at step 812. The deletion of workflow instance has no impact on the database base table record. The data remains in the base table. With no workflow instance for that record, it signals that there is work pending.

If the next state is not an end state, the current state of the workflow instance is updated with next state, at step 814.

At step 816, during a delete transaction, the workflow instance is deleted. When deleting the workflow instance, a record from the base table is removed.

Figure 9:
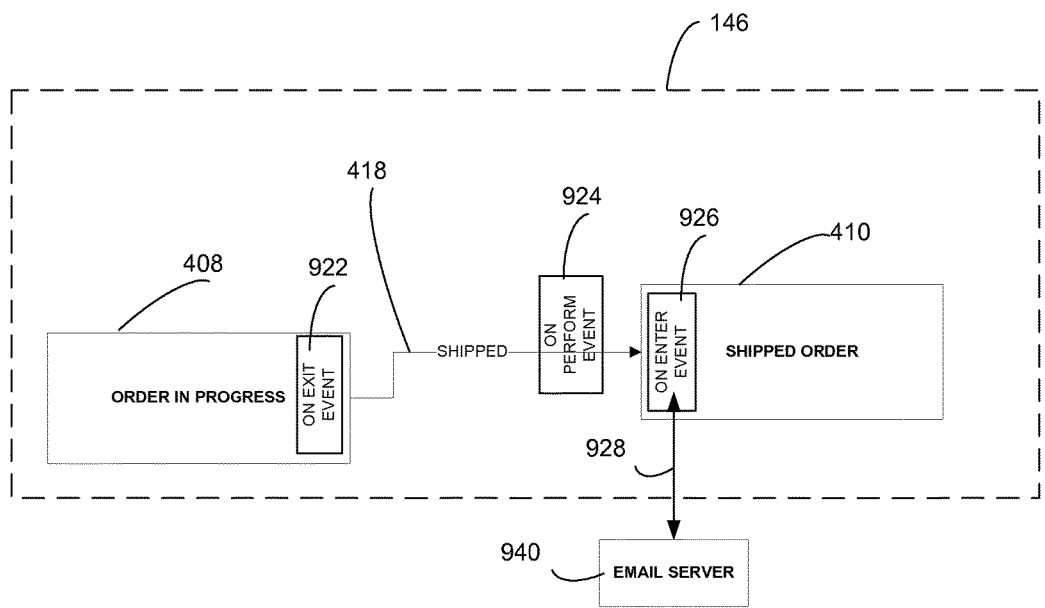
FIG. 9 illustrates a flow chart for performing a workflow event associated with workflow transactions according to one embodiment of the present invention.

Turning now to FIG. 9, a flowchart for events in a workflow transaction, in accordance to an embodiment of the invention, is illustrated. In the workflow engine 146, when an Order flows from state "Order in progress" 408 to state "Shipped Order" 410 through the use of transition "Shipped" 418, a plurality of workflow events may be executed. The transition "Shipped" 418 may be initiated by a user or a by a system. In the sample events 922, 924, 926, the events represent programming code written in any programming language to execute code on any internal or external systems 148. In this flow, an "On Exit" type event 922 may exist and get executed when exiting state 408. The "On Perform" type event 924 may exist and get executed when the transition 418 is performed. The "On Enter" type event 926 may exist and get executed when entering state 410. As an example, event 926 communicates 928 to email server 940 in a synchronous fashion to send shipment notification to the recipient of the order. When performing a successful transition, a workflow instance leaves one state and enters another state hence all three events in this example may get executed in the sequence of 922, 924 and 926. There may be several types of events that may be built around workflow movements. More granularity and context is provided with many event types.

Figure 10:
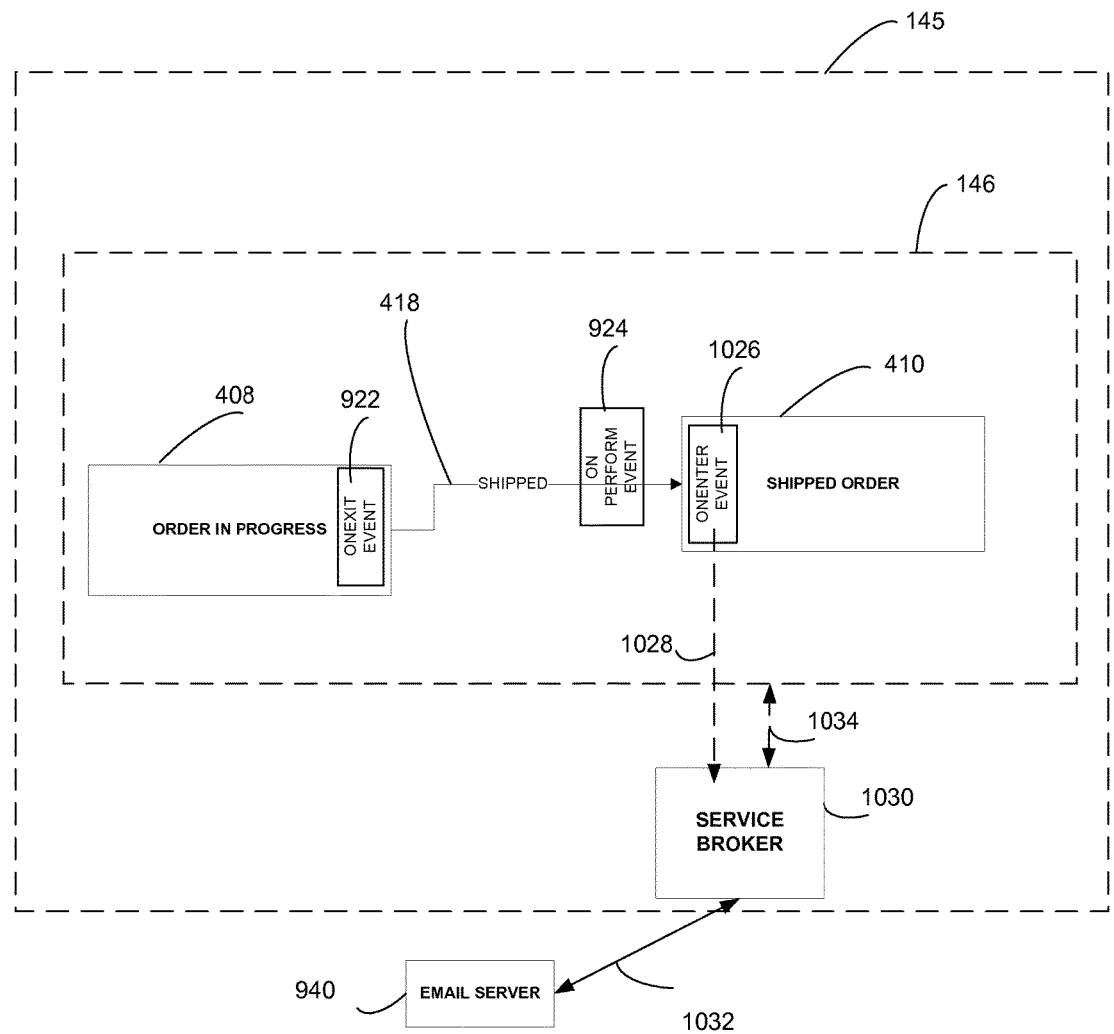
FIG. 10 illustrates a flow chart for performing the workflow event using Service Broker in a workflow transaction according to one embodiment of the present invention.

Turning now to FIG. 10, a flowchart for use of a Service Broker with events in a workflow transaction, in accordance to an embodiment of the invention, is illustrated. This flow is the same as FIG. 9, except that Service Broker 1030 is used as a broker between the workflow engine 146 and email server 940. The event 1026 is different from 926 in that it communicates 1028 to Service Broker 1030 residing in a database 145 with a delegate message to send email without waiting for if the message is actually accepted by email server 940. The Service Broker 1030 communicates to email server 940, gets a response from the email server 940 and communicates 1034 back to the workflow engine 146. The advantage of this method is that if the email server is temporarily out of service, the database transaction component of database-workflow transaction may not have to wait. The workflow transaction may have to wait until the service broker completes the work. This eliminates any overall slowdown or lock down of the system with the use of workflow events.

It should also be noted that while various embodiments may be described in terms of memory storage for graphics processing, it is contemplated that the embodiments described herein may have a wide range of applicability, not just for graphics processes, as would be apparent to one of skill in the art having the benefit of this disclosure.

The particular embodiments disclosed above are illustrative only, as the invention may be modified and practiced in different but equivalent manners apparent to those skilled in the art having the benefit of the teachings herein. Furthermore, no limitations are intended to the details of construction or design as shown herein, other than as described in the claims below. It is therefore evident that the particular embodiments disclosed above may be altered or modified and all such variations are considered within the scope and spirit of the claimed invention.

Accordingly, the protection sought herein is as set forth in the claims below.

What is claimed:

1. A computer-implemented method comprising:
   assigning a data structure stored in a database comprising a workflow engine to one or more workflow processes; and
   creating an instance of at least one of the one or more workflow processes through the workflow engine as part of an integrated database-workflow transaction populating the data structure with a new record, wherein as part of populating the data structure with a new record, the workflow engine takes control of the database transaction via one or more table level triggers, performs the workflow steps and signals the database for the database transaction to either complete or fail, and/or removing an instance of at least one of the one or more workflow processes as part of an integrated database-workflow delete record transaction, wherein as part of the delete record transaction, the workflow engine takes control of the database transaction via the table level triggers, performs the workflow steps and signals the database for the database transaction to either complete or fail.

2. The computer-implemented method of claim 1, further comprising:
   assigning an application to the one or more workflow processes, wherein the application performs operations on the data structure.

3. The computer-implemented method of claim 1, wherein the data structure is a base table comprising a plurality of rows, and wherein each row represents an instance of one or more workflow processes.

4. The computer-implemented method of claim 3, wherein a workflow transaction is completed upon activation of the one or more table level triggers when adding, updating or deleting a record in the data structure.

5. The method of claim 1, wherein the one or more workflow processes are controlled by changes to data in the data structure.

6. The method of claim 1, wherein the workflow engine resides in a database layer of the database.

7. A non-transitory computer-readable storage medium including a program, which when executed on a processor performs an operation, the operation comprising:
   assigning a data structure stored in a database comprising a workflow engine to one or more workflow processes; and
   creating an instance of at least one of the one or more workflow processes through the workflow engine as part of an integrated database-workflow transaction populating the data structure with a new record, wherein as part of populating the data structure with a new record, the workflow engine takes control of the database transaction via table level triggers, performs the workflow steps and signals the database for the database transaction to either complete or fail, and/or removing an instance of the one or more workflow processes as part of an integrated database-workflow delete record transaction, wherein as part of the delete record transaction, the workflow engine takes control of the database transaction via the table level triggers, performs the workflow steps and signals the database for the database transaction to either complete or fail.

8. The computer-readable storage medium of claim 7, further comprising:
   assigning an application to the one or more workflow processes, wherein the application performs operations on the data structure.

9. The computer-readable method of claim 7, wherein the data structure is a base table comprising a plurality of rows, and wherein each row represents an instance of one or more of the one or more workflow processes.

10. The computer-readable method of claim 9, wherein a workflow transaction is completed upon activation of the one or more triggers when adding, updating or deleting a record in the data structure.

11. A system, comprising:
a processor; and
a memory comprising a database, wherein the database comprises a workflow engine and wherein the memory also comprises a program, which, when executed by the processor, is configured to perform an operation, the operation comprising:
assigning a data structure stored in a database to one or more workflow processes; and
creating an instance of at least one of the one or more workflow processes as part of an integrated database-workflow transaction populating the data structure with a new record, wherein as part of populating the data structure with a new record, the workflow engine takes control of the database transaction via table level triggers, performs the workflow steps and signals the database for the database transaction to either complete or fail, and/or removing an instance of the one or more workflow processes as part of an integrated database-workflow delete record transaction, wherein as part of the delete record transaction, the workflow engine takes control of the database transaction via the table level triggers, performs the workflow steps and signals the database for the database transaction to either complete or fail.

12. The system of claim 11, further comprising:
assigning an application to the one or more workflow processes, wherein the application performs operations on the data structure.

13. The system of claim 11, wherein the data structure is a base table comprising a plurality of rows, and wherein each row represents an instance of one or more of the one or more workflow processes.

14. The system of claim 13, wherein a workflow transaction is completed upon activation of the one or more triggers when adding, updating or deleting a record in the data structure.

15. The system of claim 11, wherein at least one database front-end application tool operates without being aware of the presence of the workflow engine.

16. The system of claim 11, wherein at least one of an application and a database front-end application tool operate with awareness of the workflow engine with the use of a workflow engine Application Programmatic Interface (API).

17. The system of claim 11, wherein the workflow engine creates one or more event types, wherein each of the one or more event types represent a workflow movement type, wherein each workflow movement type is associated with one or more workflow elements, wherein each of the one or more workflow elements executes program code associated with at least one or more databases, thereby providing integrated workflow and database transactions.

18. The system of claim 17, wherein the memory further comprises at least one of a Service Oriented Architecture (SOA) or Service Broker, which enables and/or facilitates an integrated database-deferred workflow transaction.

* * * * *